Jan. 3, 1939.  C. G. OLSON  2,142,820
SELF-GRIPPING DEVICE
Filed May 22, 1937
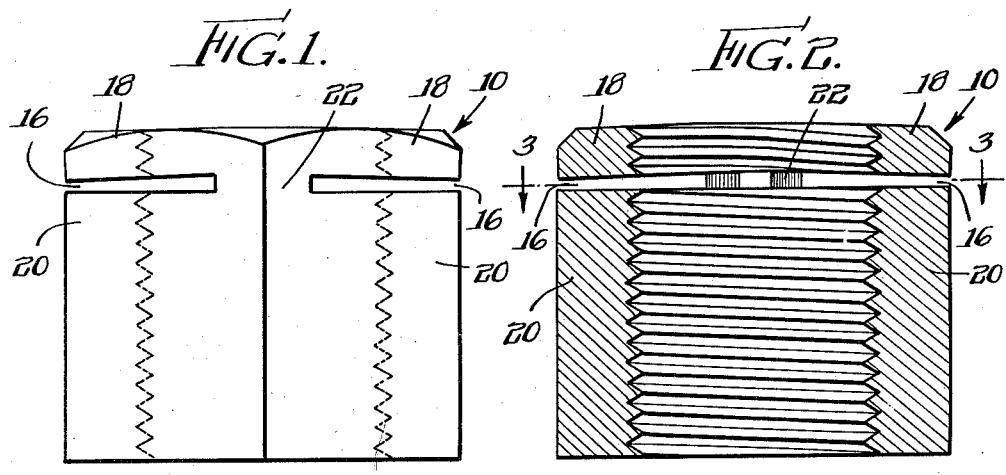
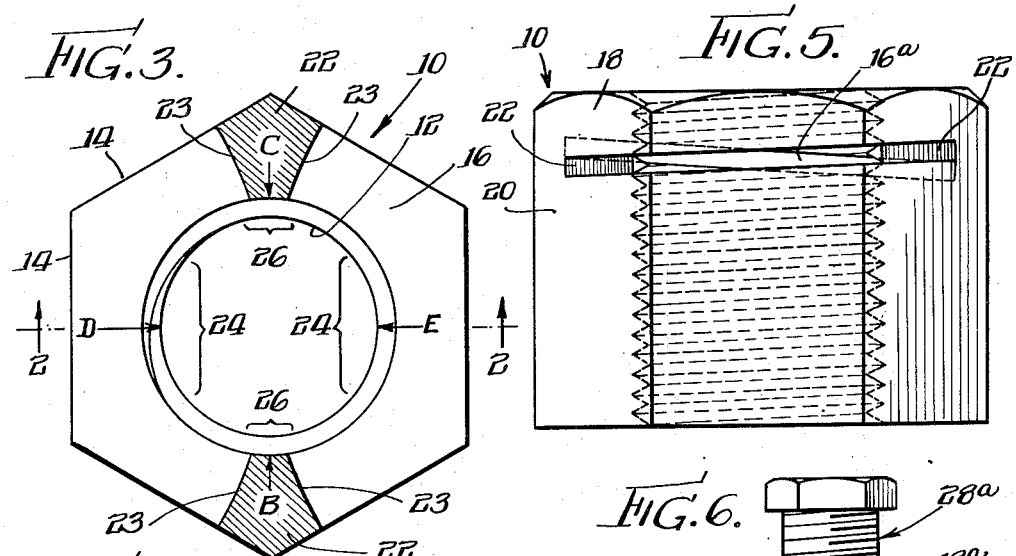
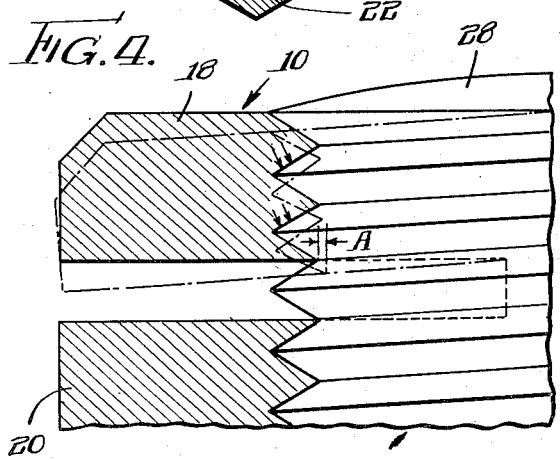
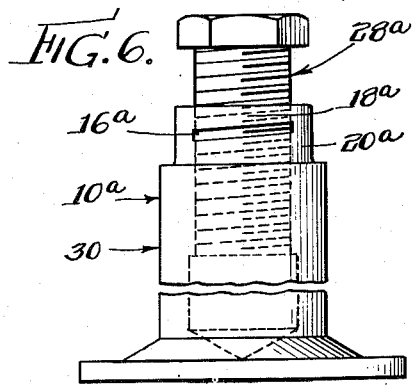
Inventor
Carl G. Olson
By: Cox & Moore
attys.

Patented Jan. 3, 1939

2,142,820

UNITED STATES PATENT OFFICE

2,142,820
SELF-GRIPPING DEVICE

Carl G. Olson, Chicago, Ill., assignor to Illinois Tool Works, Chicago, Ill., a corporation of Illinois Application May 22, 1937, Serial No. 144,197

7 Claims. (Cl. 151—21)

This invention relates generally to self-gripping devices, and more particularly to devices of the type disclosed in my copending application Serial No. 70,232, filed on the 23rd day of March, 1936.

It is an object of the present invention, as well as the invention set forth in my above mentioned copending application, to provide an internally threaded member which will serve to effectively and automatically grip the complementary thread of a screw so as to prevent unauthorized or independent relative rotation of said parts.

The present invention contemplates certain structural improvements over the invention disclosed in my above mentioned copending application, particularly as applied to the arrangement of the oppositely disposed recesses which permit oppositely disposed sections of an internally threaded member such as a nut to be normally distorted.

More specifically, the invention contemplates an arrangement of oppositely disposed recesses, as set forth above, wherein the sections of the stock which serve as a support for the yieldable portions of the nut, are so configurated as to render the nut more efficiently operative when in use.

Still more specifically, the invention contemplates an arrangement of recesses which permits the yieldable sections of the nut to be distorted in a manner which will subject the material of the nut to a minimum degree of stress, or, in other words, to counteract tendency for the material of the nut to fracture in response to the distortion or moving or shifting of the yieldable sections which are adapted to grip the external threads of a complementary screw.

The foregoing and numerous other objects and advantages will be more apparent from the following detailed description when considered in connection with the accompanying drawing—

Figure 1 is a side elevational view of a gripping device or nut which is representative of one embodiment of the invention;

Figure 2 is a central transverse sectional view thereof taken substantially along the line 2—2 of Figure 3;

Figure 3 is a transverse sectional view of the device taken substantially along the line 3—3 of Figure 2;

Figure 4 is an enlarged fragmentary sectional view of the nut shown in operative gripping association with a screw, the dot-and-dash lines indicating the normal position occupied by a section of the nut when it is disassociated from the screw;

Figure 5 is a side elevational view of a self-gripping device similar to that disclosed in Figures 1 to 3, inclusive, said device differing therefrom in the provision of oppositely disposed recesses which extend in substantial parallelism with the helix of the internal thread; and Figure 6 discloses the invention as applied to a valve tappet to show that the invention is not necessarily limited to a rotary threaded member such as a nut, but is adapted for other internally threaded devices in which a screw is desired to be secured in various positions of adjustment.

Referring now to the drawing more in detail, wherein like numerals have been employed to designate similar parts throughout the various figures, it will be seen that one embodiment of my invention contemplates an internally threaded device or nut designated generally by the numeral 10. The nut is provided with the usual internal thread 12 and a sufficient number of sides 14 to enable the nut to be conveniently gripped by a turning device such as a wrench. Diametrically opposite portions of the nut are provided with recesses or slots 16. These slots or slits 16 divide the nut into sections, which I prefer to refer to as yieldable sections 18 and a rigid section 20. The slots 16 terminate short of the center of the nut body sufficiently to enable the provision of connecting sections 22. The slots 16 are sufficiently narrow so as to render these sections 22 relatively rigid.

The yieldable or resilient sections 18 of the nut body normally assume the deflected position shown in Figures 1 and 2. This deflection or distortion of the sections 18 toward the rigid section 20 causes portions of the thread in the yieldable sections 18, indicated by the brackets 24 of Figure 3, to normally occupy a disalined position with respect to the thread portions indicated by brackets 26 (Figure 3). Thus the relatively small portions of the thread helices in the connecting sections 22 remain in helical alinement with the thread in the rigid section 20, whereas the portions of the thread helices in the yieldable sections 18 are normally in helical disalinement with the thread in the rigid section 20 of the nut body.

When the nut 10 is applied to a complementary screw 28, it turns freely when only the thread in the rigid body section 20 engages the thread on the screw. When the distorted or disalined thread portions 24 engage the screw 28, the yieldable sections 18 shift from the dot-and-dash position indicated in Figure 4 to the solid line position. This causes the thread portions 24 in the yieldable sections 18 to exert a firm frictional grip against the complementary portions of the thread in the screw 28, as indicated by the arrows in Figure 5, and also causes the thread in the rigid section 20 to exert a force in an opposite direction against the complementary thread on the screw 28, as indicated by the directional arrows in Figure 4. By having these forces acting simultaneously at diametrically opposite positions, a balanced frictional grip results. In other words, the threaded device or nut 10 is secured in position upon the screw by balanced forces acting in opposed directions on opposite sides of the screw body. This is to be clearly distinguished from gripping devices with which I am familiar wherein an unbalanced gripping effect is obtained.

Particular attention is also directed to the fact that the distortion of the yieldable sections 18 is obtained without subjecting the thread portions 26 to any helical distortion; that is to say, the helical distortion of the thread only takes place on those portions, namely, the thread portions 24 which are particularly adapted to frictionally grip the thread on the screw 28 in a balanced manner.

It might also be stated that the distortion or deflection of the yieldable sections 18 as described causes the threaded aperture extending through the sections 18 to assume a slightly elliptical form. In Figure 4 the distance indicated by the letter A shows that the deflecting of the yieldable sections 18 causes the thread portions thereof to be shifted slightly inward, as well as axially. In other words, viewing the aperture in plan as in Figure 3, the major axis of the ellipse just mentioned extends from the point indicated by the letter B to the point indicated by the letter C and the minor axis extends from D to E. In view of the fact that this lateral movement of the thread portions 24 amounts to only a few thousandths of an inch, I have not attempted to indicate an elliptical form in Figure 2, but have referred to the dimension A in Figure 5 wherein the screw and nut are enlarged. It will therefore be apparent that this elliptical formation of the threaded aperture is produced by transversely and axially shifting equal portions of the diametrically disposed threads, namely, the portions 24, and maintaining the diametrically disposed thread portions 26 against transverse and axial shifting.

In Figure 6 I have disclosed the manner in which my invention may be applied to a threaded member, which is not necessarily of the rotatable type such as a nut. In Figure 6 I have shown a valve tappet indicated generally by the numeral 30, which includes an internally threaded portion designated generally by the numeral 10a and an adjustable screw 28a. The internally threaded member 10a is provided with diametrically disposed slots 16a, which separate the body 10a into yieldable sections 18a and rigid sections 20a. These resilient and rigid sections cooperate in the manner previously described in connection with Figure 5. In Figure 6 the internally threaded element or member 10a serves to secure the screw 28a in various positions of adjustment by exerting the same frictional grip against the thread thereof as the nut 10 exerts against the screw 28 just described.

It will be noted that the oppositely disposed slots 16a, as well as the corresponding slots of the nut in Figure 5, are arranged in substantial parallelism with the juxtapositioned portions of the thread helix. This is to be distinguished from the slots shown in my copending application, which extend perpendicular to the axis of the nut. By disposing the slots in substantial parallelism with the thread helix, the degree of abruptness resulting from the cutting of the slot into the nut in the vicinity of the thread helices is materially reduced. Thus a smoother internal thread helix without the presence of sharp corners which might have a tendency to disfigure or mar the thread on the screw, is obtained by having the slots disposed as shown in Figures 5 and 6.

Attention is directed to the cross-sectional shape of the connecting sections 22 (Figure 3). Oppositely disposed sides 23 of the sections 22 are substantially radial with respect to the axis of the nut 10. Thus, when the sections 18 are flexed to the position shown in Figures 1 and 2, this flexing takes place along an area or line which is substantially radial to the axis of the nut, and hence subjects the material to the least possible strains or fracture. The side surfaces 23 are slightly arcuate, said surfaces resulting from the cut made by a rotary cutter used to produce the slots 16. The invention has been commercially employed with great success by using connecting sections which have parallel side surfaces. It will be noted that, by employing connecting sections which have the arcuate or radial side surfaces 23, the undistorted portion of the thread is reduced in size, thereby enabling a more gradual merging of the distorted or displaced thread sections on one side of the nut with the complementary displaced thread sections on the other side.

From the foregoing, it will be apparent that my invention contemplates an improved self-gripping device such as a nut, wherein a positive frictional grip between the complementary threads of the nut and screw is obtained. Furthermore, the self-gripping devices herein described have been scientifically designed from the standpoint of practical engineering. In other words, the device as a unit exerts a uniform balanced grip and hence is designed to render maximum gripping or locking efficiency. No unbalanced or non-uniform application of forces exists which would have a tendency to lessen the gripping effectiveness. In fact, all of the forces on one side of the device, which frictionally grip the complementary portions of the thread in the screw, act simultaneously with forces of the same degree acting in the same direction and relative location on the other side of the screw. Stating it in another way, the resilient and rigid sections of the internally threaded element exert a balanced gripping force, and the sum total of these balanced forces is infinitely greater in gripping effectiveness than the gripping forces in other conventional locking devices with which I am familiar. The above described invention may be incorporated within internally threaded elements such as nuts by the practice of simple, economical machine shop methods. The slitting of the nut at diametrically opposite positions and the subsequent disalinement of portions of the thread may be accomplished at relatively low cost and without subjecting the material to distortions in excess of its elastic limit. Furthermore, my invention enables the slotting of the internally threaded device or nut to be accomplished without impairing the strength thereof.

It will also be apparent from the foregoing description that the disalinement of the thread segments 24 is sufficiently gradual to enable the tightening approach of these thread segments and the complementary thread portions of the screw in a manner to frictionally engage without injury to the thread. Thus, one of the segments of the thread portion 24 beginning from a point of helical alinement, namely from the connecting section 22 gradually diverges from helical alinement to the point of maximum disalinement, namely the points D and E (Figure 3), and then gradually merges into helical alinement with the oppositely disposed connecting section 22. This not only affords the balanced frictional grip referred to above, but also enables the disalined thread segments on the nut to gradually move into frictional engagement with the complementary thread portions on the screw without scoring or otherwise injuring the thread helices.

By having the oppositely disposed slots arranged in substantial parallelism with the thread helix, undesirable sharp or rough corners in the vicinity of the thread helix is avoided. This serves to render the nut less liable to injure the thread on a companion screw. Also, by having the connecting sections 22 provided with side surfaces or walls radially disposed with respect to the nut axis, the flexing of the yieldable section takes place along an area or line which subjects the material to the least possible strains or fracture.

By having the recess 16a disposed at an angle as illustrated in Figure 5, the stock of the yieldable section 18 is thicker on the left side than it is on the right side, as viewed in Figure 5. This renders one side of the section 18 more resilient or yieldable than the other side. I prefer, therefore, in deflecting the section 18 to impart a slightly greater deflection to the thinner side than to the thicker side. In view of the fact that this difference in deflection would be so slight, I have not endeavored to indicate the difference in the degree of deflection in the drawing. It will be understood, however, that, by deflecting the more resilient portion of the section 18 a greater amount than the thicker and less resilient portion thereof, the gripping forces exerted by the section 18 upon the complementary threads of a screw are balanced. That is to say, despite the inequality in stock thickness at opposite sides of the resilient section 18, the gripping or clamping forces exerted, when the section is displaced from its normal position of deflection, are substantially the same at all points. It is desirable to have a balanced gripping action exerted against the screw threads in order to provide greatest locking efficiency.

The invention is not limited to the specific structures shown in the drawing, but contemplates other modifications and changes without departing from the spirit and scope of the appended claims.

Having thus described my invention, what I claim as new and desire to secure by Letters Patent is:

1. In a device of the class described an internally threaded body, said body having a plurality of recesses, said recesses extending in the general direction of the internal thread helices, internal thread portions in the vicinity of said recesses being normally positioned in relatively gradual disalinement with other thread portions of the body, whereby to enable said normally disalined thread portions to frictionally grip complementary thread portions of a screw.

2. In a device of the class described an internally threaded body, said body having diametrically positioned recesses partially traversing the threaded body, said recesses extending in the general direction of the internal thread helices, internal thread portions in the vicinity of said recesses being normally positioned in relatively gradual disalinement with other thread portions of the body, whereby to enable said normally disalined thread portions to frictionally grip complementary thread portions of a screw.

3. In a device of the class described an internally threaded body, said body having a plurality of recesses, portions of said body in the vicinity of said recesses being normally deflected in an axial direction about lines substantially radial with respect to the axis of the threaded body so as to position thread portions in the vicinity of said recesses in relatively gradual disalinement with other thread portions on the body, whereby to enable said normally disalined thread portions to frictionally grip complementary thread portions of a screw.

4. In a device of the class described an internally threaded body, said body having a plurality of oppositely disposed recesses partially traversing said body, and connecting sections interposed between said recesses, each of said connecting sections having oppositely disposed arcuate surfaces, portions of said body adjacent said recesses being normally displaced so as to position thread portions in the vicinity of said recesses in relatively gradual disalinement with other thread portions on the body, whereby to enable said normally disalined thread portions to frictionally grip complementary thread portions of a screw.

5. In a device of the class described an internally threaded body, said body having a plurality of oppositely disposed recesses partially traversing said body, and connecting sections interposed between said recesses, each of said connecting sections having oppositely disposed surfaces radially positioned with respect to the axis of said threaded body, portions of said body adjacent said recesses being normally displaced so as to position thread portions in the vicinity of said recesses in relatively gradual disalinement with other thread portions on the body, whereby to enable said normally disalined thread portions to frictionally grip complementary thread portions of a screw.

6. In a device of the class described an internally threaded body, said body having a plurality of recesses, portions of said body in the vicinity of said recesses being normally deflected in an axial direction about lines substantially radial with respect to the axis of the threaded body so as to position thread portions in the vicinity of said recesses in relatively gradual disalinement with other thread portions on the body, whereby to enable said normally disalined thread portions to frictionally grip complementary thread portions of a screw, one side of each body section in the vicinity of the recess being normally deflected a greater amount than the other side of said section.

7. An internally screw threaded fastening device of the class described, two connected sections, one of said sections having greater axial thickness than the other, and a pair of spacers of multi-sided cross-section integrally connecting said sections, the top of the thicker section being separated by said spacers into two oppositely positioned plane areas angularly disposed with respect to the axis of the device, each plane area being substantially parallel with the helix of the thread in the thicker section, the thinner section having oppositely positioned bottom surfaces, said bottom surfaces being positioned out of parallelism with said top plane surfaces of the thicker section, whereby to position the thread helices of said thinner section out of helical alinement with the thread helices of said thicker section.

CARL G. OLSON.